Figure 1:
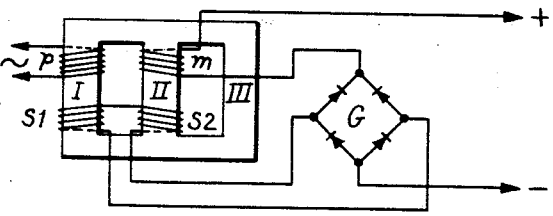

Sept. 26, 1939.  W. KALBSKOPF  2,173,905

VOLTAGE-COMPENSATING TRANSFORMER

Filed May 28, 1937

INVENTOR
WALTER KALBSKOPF
BY R.C.Hopgood
ATTORNEY

Patented Sept. 26, 1939

2,173,905

UNITED STATES PATENT OFFICE 2,173,905

VOLTAGE-COMPENSATING TRANSFORMER

Walter Kalbskopf, Nuremburg, Germany, assignor to Suddeutsche Apparate-Fabrik G. m. b. H., Nuremburg, Germany, a company Application May 28, 1937, Serial No. 145,396
In Germany May 30, 1936

6 Claims. (Cl. 175—363)

Electric rectifying systems, especially those acting with the aid of metal dry-rectifiers, are frequently expected to produce direct current potentials which in the case of load variations shall vary only within comparatively narrow limits.

If rectifying devices are not provided with voltage-controlling means, the direct voltage will with increasing load considerably decrease on account of the drop of potential across the rectifying valves.

Diverse devices and circuit arrangements are known by which an automatic voltage compensation is obtained in dependence on the demand upon the rectifier. For instance, it is known to employ regulating chokes the primary of which is connected in series with the primary or the secondary of a transformer supplying the rectifying valve and through the secondary of which the utilization current flows. These chokes are gradually saturated with the utilization current increasing. The voltage drop across the primary of the regulating choke consequently decreases while the voltage at the transformer increases by the same amount, thus compensating the increased potential drop at the rectifying valve. By properly dimensioning the regulating choke it is possible to balance the device in such a manner that the direct potential at the receiver- or utilization-apparatus shall be constant whether the load increase or decrease.

Also, devices are known in which the voltage compensation occurs at the transformer itself. In the known compensation transformers the primary, the secondary and the magnetising winding are coiled around separate cores of the transformer. The voltage regulation is here obtained in such a way that the magnetising winding flown through by the direct current controls the magnetic flux in the secondary winding and hence also controls the voltage of this winding.

By connecting two magnetising windings in opposition to each other it will in a well known manner be possible in connection with regulating chokes and also with regulating transformers to prevent an alternating current component from entering the utilization circuit, and this can be attained without annulling the magnetising effect of these windings.

The known voltage-regulating devices for rectifier arrangements have several disadvantages which are obviated by the invention.

As regards the provision of a regulating choke, these disadvantages are as follows. In the first place, in order to obtain a voltage-regulation a choke coil must be provided in addition to the transformer. This requirement considerably adds to the expense for such rectifying devices. Furthermore, on account of the complicated vectorial dependence of the voltages of both transformer and regulating choke such rectifying devices cannot be calculated but for distribution mains of a definite voltage. In fact, it is not possible to arrange for connecting such devices to different mains-voltages by joining them to different taps of the transformer and choke. Also it is not possible correctly to design the winding of such regulating choke. On the contrary, each choke must be adjusted separately after having been connected to the apertaining transformer and rectifying valve.

The hitherto known regulating transformers likewise have disadvantages. Either a plurality of transformers are necessary or the voltage compensation obtained is imperfect and does not occur within the necessary limits, this being due to the dispersion in the secondary winding.

These disadvantages are avoided by the invention described hereinafter by way of example. The invention enables an ideal voltage compensation to be obtained with the aid of one transformer, as will be understood from the following description, reference being had to the accompanying drawing in which Figs. 1 to 5 are wiring diagrams each showing one embodiment of the invention.

Figure 3:
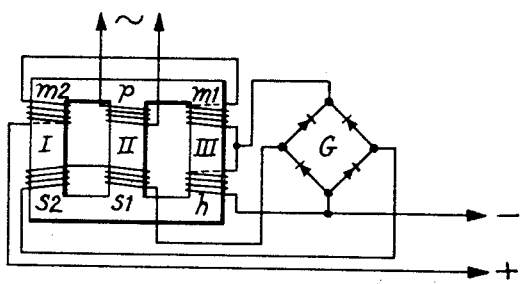
Figure 4:
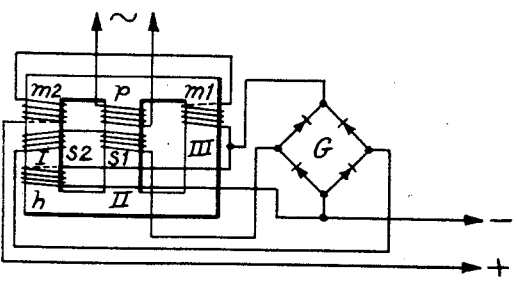
Figure 5:
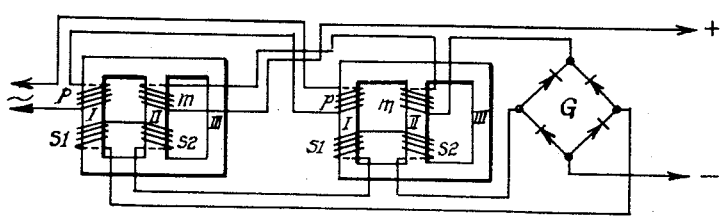

Each of the arrangements represented in Figs. 1 to 4 has a three-legged iron core of the kind used in three-phase transformers while the arrangement represented in Fig. 5 has two such cores. The legs thereof are designated I, II, III. A source of the alternating currents to be rectified, which is denoted by the sign ~, is connected to a coil $p$ which is the primary of the voltage-compensating transformer. The secondary thereof consists of a main winding $s1$ and an auxiliary winding $s2$. The windings $s1$, $s2$ are disposed on different legs, winding $s1$ being coiled around the leg fitted with the primary $p$, and are interconnected in opposition to each other. G denotes a rectifier. $m$, $m1$, $m2$, $h$ designate direct current coils disposed on the legs I, II, III.

These parts are interconnected in the manner that appears from the drawing.

In the arrangement shown in Fig. 1, primary $p$ and winding $s1$ are coiled around leg I while the windings $m$, $s2$ are arranged on leg II. Leg III has no winding.

In the condition of no load no current flows in coil $m$, this being included in the utilization circuit. Part of the alternating flux produced by the primary $p$ is acting on the counter-winding $s2$. The energy thus inducted in this winding decreases the secondary voltage which would be applied to rectifier G by winding $s1$ alone, that is, if this winding were not counter-acted by winding $s2$.

In the state of full load leg II is magnetically saturated or highly magnetised by the coil $m$. As a result the alternating flux component that before has been acting on the winding $s2$ is completely or almost completely caused to flow through leg III. The counter-voltage before induced in the winding $s2$ disappears or decreases accordingly, the voltage effective at rectifier G thus increasing.

In this way the counter-action of the winding $s2$ is controlled by the utilization circuit and with the aid of the coil $m$ in such a manner that within the limits determined by the conditions of no load and full load there shall be applied to the rectifier that voltage in each case which is necessary in order to compensate for variations which occur in the utilization circuit.

Since coil $m$ is likewise acted upon by the alternating flux an alternating current component will be transferred to the direct current side. If it is desired to avoid this, two such transformers, each of half power, may be inter-connected by connecting their coils $m$ in series in such a manner that the alternating voltage components shall neutralize each other. Such an arrangement is illustrated in Fig. 5, the operation being essentially like that of Fig. 1.

By providing the primary $p$ with taps the transformer is easy to connect to different mains voltages. This is not possible in the case of regulating chokes. By selectively connecting the primaries of two transformers either in parallel or in series these may be connected to two different mains voltages without taps being required and without the necessity for a surplus expenditure of copper. Due to the fact that with the novel arrangement the correlation of the individual values of the alternating current is not of vectorial nature the transformer windings are comparatively easy to calculate so as to do away with the troublesome adjusting necessary in the case of regulating chokes.

A device according to the invention may be used with a rectifier associated with a resistance load and is adapted also for compensating batteries and further suitable for charging storage batteries or accumulators. Experiments have shown that in the case of resistance load a voltage consistency of $\pm 2\%$ is easy to obtain even under unfavorable conditions. Also it has been found by experiments that there is within wide limits an approximately proportional relation between the direct current increase and alternating voltage increase. In the case of battery compensation the starting and stoppage of the charging current may be made to occur within very narrow limits of the battery voltage, as between cell potentials of from 2.2 to 2.4 volts, for example.

The arrangement shown in Fig. 1 also allows of quickly charging a buffer battery from time to time. In order to perform this, the coil $m$ or winding $s2$ or parts of these have to be short-circuited.

Figure 2:
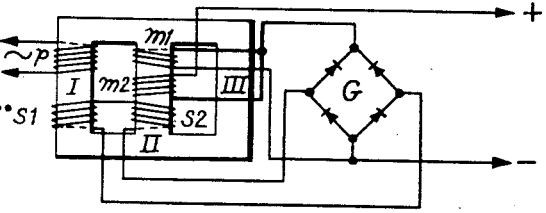

If the arrangement disclosed in Fig. 1 is to be used for the charging of a storage battery then instead of coil $m$ two coils $m1$, $m2$ are disposed on leg II, as represented in Fig. 2, $m1$ being connected to the charging voltage while $m2$ is included in the charging circuit and in this regard is equivalent to coil $m$, Fig. 1. The coils $m1$, $m2$ are arranged to oppose each other.

In the state of no load, Fig. 2, only coil $m1$ carries direct current, thus magnetising leg II to such extent that no alternating voltage can be induced in the winding $s2$. Therefore the undiminished voltage of the winding $s1$ is now applied to rectifier G. When, however, the battery to be charged is cut in, coil $m2$ too carries the charging current and thus acts to neutralize the magnetising effect of coil $m1$. The alternating flux now also flows through leg II, thus inducing an alternating voltage in winding $s2$. The voltage at rectifier G hence decreases for the reasons stated. The arrangement is such that when connecting the battery the charging current has its maximum intensity. If now during the charging the intensity of the charging current decreases under the action of the increasing counter-voltage of the battery, then the influence of the coil $m1$ will predominate. As a result, leg II is magnetised so as to decrease the voltage induced in winding $s2$, thus increasing proportionally the voltage induced in winding $s1$, whereby the charging current is given its original strength. In this way the charging current will act with its full intensity until the charging has been finished.

In the arrangement shown in Fig. 3 the primary $p$ and winding $s1$ are disposed on leg II. Winding $s2$ and a direct current coil $m2$ are arranged on leg I. Leg III carries a direct current coil $m1$ and a direct current coil $h$ that forms a large number of turns of thin wire and is arranged to act in opposition to coil $m1$.

The action of the coils $p$, $s1$, $s2$ is the same as before described. In the state of no load, only coil $h$ carries direct current. By coil $h$ the leg III is magnetically saturated. Hereby the alternating flux produced by the primary $p$ is prevented from entering the leg III. A component of this alternating flux is therefore active in leg I. In the state of load, however, coils $m1$, $m2$ too carry the direct current. Coil $m1$ in the case of full load therefore acts to neutralize the magnetising effect of the coil $h$. Coil $m2$, however magnetises the leg I and thus causes the magnetic flux produced by coil $p$ to flow into leg III. The number of the lines of force in leg I, and hence the voltage in winding $s2$ is hereby decreased. Consequently the alternating voltage applied to rectifier G increases accordingly, being the difference of the voltages produced in the windings $s1$, $s2$. This arrangement thus acts in a manner quite similar to the systems described with reference to Figs. 1 and 2. The alternating voltages induced in the coils $m1$, $m2$ neutralize each other, because these are interconnected in opposition to each other.

The arrangement represented in Fig. 4 similarly to that shown in Fig. 2 serves to charge storage batteries. For this purpose the coil $h$ is not disposed on leg III, as in the case of Fig. 3, but is disposed on leg I.

When here the maximum charging current is flowing through such battery, the magnetising effect of coil $h$ is neutralized by the counter-coil $m2$ while coil $m1$ acts to highly magnetise leg III. The primary alternating flux is hereby caused to flow in leg I instead of leg III. Consequently the alternating voltage in winding $s2$ increases so that the alternating voltage resulting from the co-operation of $s1$ and $s2$ and applied to rectifier G is small. If now the counter-voltage of the battery rises, the charging current tends to decrease. As a result, the magnetising effect of coil $h$ will predominate again while in leg III the magnetisation effected by coil $m1$ is diminished. Therefore the magnetic lines of force are caused to flow into leg III instead of leg I. The alternating voltage produced in winding $s2$ consequently decreases, whereby as before described the alternating voltage effective at rectifier G is raised. The coils or windings of the transformer are so calculated that the increasing battery voltage is compensated by the increasing rectifier voltage, the charging current being kept constant in this way.

What is claimed is:

1. A voltage compensating arrangement comprising in combination with a utilization circuit an alternating current source, a three-legged iron core, a primary coil connected to this current source and disposed on one leg of said core, a main secondary winding coiled around this leg, an auxiliary secondary winding coiled around another leg of the said core and connected in opposition to the main secondary, a rectifier connected to said secondary windings, a direct current coil disposed on the second said leg, connected to said rectifier and included in the utilization circuit.

2. A voltage compensating arrangement according to claim 1, further comprising a second core similar to said core first mentioned and having a similar set of coils and windings similarly connected, the two different current coils being interconnected in opposition to each other.

3. A voltage compensating arrangement comprising in combination with a utilization circuit an alternating current source, a three-legged iron core, a primary winding connected to this current source and disposed on one leg of said core, a main secondary winding coiled around said one leg, and an auxiliary secondary winding coiled around a second leg of the said core and connected in opposition to the main secondary, a rectifier connected to said secondary windings, a first direct current coil on the said second leg, a second direct current coil arranged on the third leg, and an additional direct current coil on said third leg and joined to said second direct current coil in opposition to it, these three direct current coils being connected to said rectifier, and said first and second coils being serially included in the utilization circuit.

4. An arrangement according to claim 3, wherein the first and second said direct current coils are interconnected in opposition to each other.

5. A voltage compensating arrangement comprising in combination with a utilization circuit an alternating current source, a three-legged iron core, a primary coil connected with this current source and disposed on one leg of said core, a main secondary winding coiled around this leg, an auxiliary secondary winding coiled around a second leg of the said core and connected to the main secondary in opposition to it, a direct current coil on this second leg, a direct current coil arranged on the third leg, and an additional direct current coil on the said second leg, and a rectifier included in the utilisation circuit serially with the two first said direct current coils, said additional direct current coil being connected across to the direct current terminals of the rectifier.

6. A voltage compensating arrangement according to claim 1 having a second direct current coil in addition to the said direct current coil and disposed on the same leg, these two coils being connected in opposition to each other, and said second direct current coil being connected across the direct current terminals of said rectifier.

WALTER KALBSKOPF.